United States Patent Office 3,007,899
Patented Nov. 7, 1961

3,007,899
POLYURETHANE (ESTER GLYCOL) COMPOSITIONS
Subbaraju Venkataramaraj Urs, Cheshire, Conn., assignor to Union Carbide Corporation, a corporation of New York
No Drawing. Filed July 16, 1958, Ser. No. 748,781
18 Claims. (Cl. 260—75)

This invention relates to polymeric materials. More particularly, it relates to new and improved polyurethanes and to their preparation as well as articles formed thereof.

Heretofore, polyurethanes have been prepared by reacting a glycol with a diisocyanate. Films formed from these polyurethanes are brittle and inelastic and thus unsuitable for use in applications requiring flexibility and elasticity.

An object of this invention is to provide new and improved polymeric materials.

Another object of this invention is to provide new and improved polyurethanes.

Still another object is to provide a method of preparing the aforementioned polymeric materials and polyurethanes.

A further object is to provide flexible and elastic films from the aforementioned polyurethanes.

Further objects and advantages will become apparent from this specification and appended claims.

It has been found that polyurethanes having the above characteristics can be prepared by reacting from one up to about 1.15 moles of an aliphatic diiso compound, containing two groups of the formula —N=C=X separated by at least 4 carbon atoms and where X is a member selected from a group consisting of oxygen and sulphur, with an aggregate amount of 1 mole of a glycol mixture containing an aliphatic glycol, selected from a group consisting of primary and secondary glycols containing at least 4 carbon atoms between the hydroxyl groups, and a monomeric ester glycol, obtained by reacting 2 moles of an aliphatic glycol, selected from a group consisting of primary and secondary glycols containing at least 2 carbon atoms between the hydroxyl groups, with one mole of a dibasic organic acid, containing at least 2 carbon atoms between the carboxyl groups.

In an embodiment of this invention wherein the novel polyurethane is produced, the reaction is carried out in a liquid medium in which the reactants are soluble but which is inert to the polyurethane produced and in which the polyurethane produced is insoluble whereby it will be precipitated and thereafter can be easily separated, as by filtration, from the reaction mass.

Typical examples of a liquid medium, which is inert to the polyurethanes produced, are solvents and mixtures thereof which can be heated to the proper temperature, preferably those boiling above 100° C., such as hydrocarbons like tetralene, xylene and mesitylene and halogenated hydrocarbons like chlorobenzene, orthodichlorobenzene and 1, 3, 5 trichlorobenzene.

The selected glycols and glycol ester are mixed with the inert solvent and the resultant solution is heated to a temperature of from about 65° C. to about 70° C. Preferably an inert atmosphere is maintained in the reaction vessel as by constantly sweeping the reaction vessel with dry oxygen-free nitrogen, argon, helium, and like inert gases. After the mass is so heated and while it is being agitated, the diiso compound is added gradually and slowly, preferably over a period of about 45 minutes, since the reaction is exothermic. Rapid addition of the diiso compound may cause some cross linking. When all the diisocyanate has been added, the resulting mass is refluxed until the resulting solid polyurethane, upon test, will produce a film having the desired film forming properties. The refluxing usually takes approximately 8 hours. The mass is then cooled, preferably to a room temperature of from about 20° C. to about 25° C. The precipitated polyurethane is filtered from the mass and after washing, with a non-solvent such as ether to remove impurities, is dried.

In preparing polyurethanes by this invention, the aliphatic diiso compound used can be any aliphatic diiso compound, such as the diisocyanates, diisothiocyanates and mixed isocyanates-isothiocyanates, and the like, which contain two groups of the formula —N=C=X separated by at least four carbon atoms and where X is a member selected from a group consisting of oxygen and sulfur and the —N=C=X groups are the only reactive groups in the diiso compound. The aliphatic radical separating the two iso groups can be a straight, branched, or cyclic chain.

Typical examples of diiso compounds which can be used for the preparation of the polyurethanes of this invention are polymethylene diisocyanates, such as tetramethylene diisocyanate, pentamethylene diisocyanate, hexamethylene diisocyanate, cycloalkylene diisocyanates, such as cyclohexylene-1,4-diisocyanate; and diisocyanates containing hetero atoms in the chain such as $$OCN(CH_2)_2O(CH_2)_2NCO$$

and mixed isocyanate-isothiocyanate, such as 1-isocyanate-6-isothiocyanate hexane and the like.

From one up to 1.15 moles of the diiso compound is used per mole of the aggregate amounts of ester glycol and aliphatic glycols. The mole quantity of the diiso compound per mole of the aggregate amounts of ester glycol and aliphatic glycols determines the properties of the film produced from the polymeric material produced. Thus, when a stretchable film is desired, the mole quantity of the diiso compound per mole of aggregate amounts of ester glycol and aliphatic glycols should not exceed 1.05. However, when an elastic film, having a returnable stretch, is desired, an amount in excess of 1.05 moles but not exceeding 1.15 moles of the diiso compound per mole of the aggregate amounts of ester glycol and aliphatic glycols should be used.

Aliphatic glycols, suitable for preparing the improved polyurethanes, include primary and secondary aliphatic glycols, and mixtures thereof, having at least 4 carbon atoms between the hydroxyl groups. The aliphatic radical between the hydroxyl groups of the glycol can be either a straight or branched chain or cyclic. The chain may also contain a hetero-atom such as oxygen. Typical examples of the aliphatic glycols which can be used, in this invention, are polymethylene glycols, of the general formula HO—$(CH_2)$nOH where $n$ is from 4 to about 10, such as tetramethylene glycol, pentamethylene glycol, hexamethylene glycol and decamethylene glycol etc.; polyether glycols, of the general formula

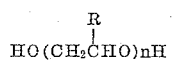

where $n$ is from 2 to 5 and R=hydrogen or a lower alkyl radical such as those containing for example from 1 to about 3 carbon atoms such as polyethylene glycol and polypropylene glycol etc.; secondary glycols of the general formula

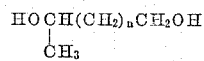

where $n$ is from 2 to about 5, such as 2,5-pentanediol, 2,7-heptanediol, 2,8-octanediol, etc.; and cyclic glycols such as 1,4-cyclohexyl glycol, etc.

The monomeric ester glycols are ester reaction products"

of a dibasic organic acid and a glycol in the ratio of 2 moles glycol to 1 mole acid. To insure production of a monomeric glycol ester however, more than a stoichiometric quantity of glycol should be present in the reaction charge. Generally about a 100 percent molar excess quantity of glycol is sufficient to produce the monomeric ester. The monomeric ester glycols can readily be prepared by charging the reactants into a round bottom flask equipped with a condenser. The system is swept with nitrogen for a period of about ½ hour and then put under vacuum for about 1½ hours, all at room temperature of about 25° C. The system is allowed to reach atmospheric pressure by admitting nitrogen gas and the reaction mixture is constantly stirred and heated to about 160° C. for about 8 hours, distilling off the water formed during the reaction. The temperature is then raised to about 200° C. for about 3 hours. Nitrogen gas can be admitted intermittently to maintain an inert atmosphere during the entire course of the reaction. The solution is then cooled to about 100° C., vacuum applied to the system and the excess unreacted glycol is preferably removed by distillation under reduced pressure.

The radicals between the hydroxyl groups in the glycols used in the production of the ester glycol can be a straight or branched chain or cyclic. The chain between the hydroxyl groups of the glycol can also contain a heteroatom such as oxygen.

Typical examples of glycols that can be used in preparing the monomeric ester glycol are: ethylene glycol, 1,2-propylene glycol, 1,3-propylene glycol, 1,4-butanediol, 1,3-butanediol, 2,3-butanediol, 1,6-hexanediol, -isoamylene glycol, polyethylene glycols such as diethylene glycol and triethylene glycol, etc., polypropylene glycols, mixed primary and secondary glycols such as 1-methyl-1,6-hexanediol, 1-methyl-1, 7-heptanediol etc., and cyclic glycols such as 1,4-cyclohexylene glycols etc.

Aliphatic dibasic organic acids which are suitable for preparing the monomeric glycol ester in addition to those described in the examples are those having an aliphatic hydrocarbon group containing at least 2 carbon atoms between the carboxyl groups which group can be a straight or branched chain. Typical examples of such acids are methyl succinic, ethyl succinic, isopropyl succinic, dimethyl succinic, -methyl glutaric, -dimethyl glutaric, -methyl adipic, brassylic, 1,14-tetradecanedioic, and 1,11-undecanedioic.

Any ester glycol which is the reaction product of one mole of an aliphatic dibasic organic acid containing at least 2 carbon atoms between the carboxyl groups with 2 moles of an aliphatic glycol, either primary or secondary, and in which the hydroxyl groups are separated by at least two carbon atoms, can be used to prepare the improved polyurethane.

The ester glycol may be symmetrical or unsymmetrical. When a symmetrical ester glycol is desired, 2 moles of an aliphatic glycol are reacted with one mole of an aliphatic dibasic organic acid. When an unsymmetrical ester glycol is desired, a mixture of aliphatic glycols is reacted with an aliphatic dibasic organic acid. Likewise, any mixture of aliphatic glycols and aliphatic dibasic acids, as herein described, can be used in the production of an ester glycol, suitable for this invention.

The relative proportions, in moles, of the glycols to the monomeric glycol ester in the reaction mixture may vary widely, with the concentration of monomeric ester glycol being from about 5 mole percent to about 95 mole percent of the total glycol content. The preferred concentration of ester glycol ranges from about 10 mole percent to about 50 mole percent of the total glycol used.

The balance of the glycol mixture can consist of a primary or secondary aliphatic glycol of the type herein described or a mixture thereof. When the balance consists of a mixture of such primary and secondary glycols, the secondary glycol is present in an amount not exceeding 50 mole percent and preferably from about 10 mole percent to about 20 mole percent thereof or the film produced will be amorphous.

In the production of the polyurethanes, the concentration of the mixture of glycols in the inert reaction solvent can also vary widely. A concentration of from about 5 percent to about 25 percent by weight of the glycol will produce satisfactory results.

As has been previously stated, the quantity in moles of the diiso compounds used in the reaction should not exceed 1.15 moles per mole of aggregate amount of ester glycols and aliphatic glycols. More than 1.15 moles of the diiso compound causes undesirable cross linking resulting in an insoluble polymer and one which cannot be melted without decomposition.

When a polymer suitable for forming into stretchable film is desired, the amount of diiso compound is kept below 1.05 and preferably less than 1.02 moles of the diiso compounds per mole of the aggregate mole amount of glycol and ester glycol. Polyurethane polymers which are the reaction products of less than 1.0 mole of diiso compound per mole of glycol and monomeric glycol ester mixture yield only weak, unsatisfactory films.

Films having good elastic properties (high returnable stretch) are obtained from polyurethanes resulting from the reaction of 1.05 to 1.15 moles diiso compound per mole of total mole content of glycol and ester glycol.

Films can be obtained from the improved polyurethanes of this invention by solvent casting methods. For example, a solution of the polyurethane is prepared by dissolving the polyurethane in hot pyridine, near its boiling point, to obtain about a 10 percent, by weight, solution. The solution is then poured onto a glass plate maintained at a temperature of about 110° F. A doctor blade giving a wet film thickness of 60 mils is used to form the solution into a film. The plate is then warmed to about 140° F. and the film is allowed to dry. When dry, depending on the air flow, the plate is cooled and the film is loosened around edges to allow moisture in the air to react with the excess diisocyanate. The film is then peeled from the plate.

Cast films of polyurethanes which are the reaction products of from 1.05 to 1.15 moles diisocyanate per mole of glycol-glycol ester mixture, are extremely difficult to remove from the plate. Release of the film from the plate can be improved by immersion in warm water for about one hour.

Polyurethanes of this invention, which are the reaction products of from about 1.0 to about 1.05 moles of an aliphatic diiso compound per mole of aggregate amounts of from about .05 to about 0.95 mole of monomeric ester glycol and respectively from about 0.95 to about 0.05 mole of aliphatic glycol, are soluble at room temperatures in dimethylformamide, diethylacetamide, formamide, cyclyohexanone, benzyl alcohol, phenol, cresol and organic bases such as pyridine, quinoline and piperidine. Films obtained by solvent casting, of the above polyurethanes, are transparent, flexible, heat sealable, printable, tough, and thermoplastic. Films obtained from the polyurethanes prepared from less than 1.05 moles of diiso compound per mole of total glycol and monomeric ester glycols are flexible over a wide range of temperatures, such as from −20° F. up to its softening point.

Polyurethanes of this invention obtained by reacting from about 1.05 moles to about 1.15 moles of an aliphatic diiso compound per aggregate amounts of from about 0.05 mole to about 0.95 mole of ester glycol and from about 0.95 mole to about 0.05 mole of aliphatic glycol, are soluble in hot pyridine and insoluble in cyclohexanol, benzyl alcohol, phenol, hot or cold. If the polymer is allowed to dry thoroughly, from chlorobenzene solvent, it cross links and becomes insoluble in hot pyridine. The cross linking is measured by the insolubility of the polymer in hot pyridine in which it was previously soluble.

Films obtained by solvent casting, of the above polyurethanes, are transparent, flexible, heat sealable, tough and have either a high returnable stretch or a high elastic recovery.

Films made from the polyurethane obtained by reacting 1.05 to 1.15 moles of the diiso compound per mole of total glycol and monomeric ester glycol have surprisingly good elasticity. These films, upon releasing the stretching force, after being stretched almost to their breaking point, will return to substantially their original shape. In addition, these films are tough, transparent, stable, printable and heat sealable.

The nature of the invention will become more apparent from the following illustrative examples.

*Example 1*

The following compounds in the proportions set out were introduced in a reaction vessel containing a solvent mixture of 180 cc. chlorobenzene and 20 cc. orthodichlorobenzene.

| | | |
|---|---|---|
| di-(B-hydroxy ethyl) glutarate, the esterification product of 2 moles ethylene glycol and 1 mole glutaric acid. | 7.28 gms. | (0.033 mole). |
| 1,4-butanediol | 4.16 gms. | (0.046 mole). |
| 2,5 hexanediol | 1.86 gms. | (0.0158 mole). |
| Diethylene glycol | 10.62 gms. | (0.1002 mole). |

An inert atmosphere of nitrogen gas was maintained in the reaction while the above-described mixture was thoroughly agitated and heated to a temperature of 65°–70° C. at which temperature 33.60 grams (0.2 mole) of hexamethylene diisocyanate were added gradually over a period of 45 minutes. After the addition of the diisocyanate, the reaction mass was heated under atmospheric reflux for 7 hours. The mass is then permitted to cool to room temperature whereupon the polyurethane precipitated out of solution from the inert solvent. The precipitated polyurethane was then filtered out of the mass, washed with diethyl ether and dried. The dried polyurethane had a softening point of 140–146° C. and was soluble at room temperature in dimethylformamide, dimethylacetamide, formamide, cyclohexanone, benzyl alcohol, phenol, cresol, and organic bases such as pyridine, quinoline, and piperidine.

A film was solvent cast by dissolving the polyurethane of Example 1 in pyridine heated to a temperature near its boiling point, to obtain a 10% solution. The solution was then poured on to a glass plate maintained at a temperature of about 110° F. A doctor blade giving a wet film thickness of 60 mils was used to form the solution into a film. The plate was then warmed to about 140° F. and the film allowed to dry. When the film was dry, the plate is cooled and the film is loosened around the edges to allow moisture in the air to react with the excess diisocyanate. The film was then peeled from the plate.

The stripped film was transparent, flexible, heat sealable, thermoplastic and tough and had the following physicals:

| | |
|---|---|
| Tensile strength | 2650 pounds/sq. in. |
| Tear strength | 277 gms. per mil. |
| Elongation at break | 395%. |
| Oxygen transmission | 12.5 cc./mil/100 sq. in./24 hrs. |
| Nitrogen transmission | 1.5 cc./mil/100 sq. in./24 hrs. |
| Carbon dioxide transmission | 93 cc./mil/100 sq. in./24 hrs. |
| Moisture vapor permeability | 26 g./mil/100 sq. in./24 hrs. |

*Example 2*

A polyurethane was prepared according to the process described in Example 1 except that the monomeric ester glycol used, di-(B-hydroxy ethyl) succinate, was a reaction product of 2 moles ethylene glycol and 1 mole succinic acid and was used in the amount of 6.82 gms. (0.033 mole). The resultant polyurethane had a softening point of 152–160° C. and solubility characteristics similar to those described in Example 1.

Films produced from the polymer of Example 2 by the procedure set out in Example 1 were transparent, flexible, heat sealable, thermoplastic and tough. They also have the following physicals:

| | |
|---|---|
| Tensile strength | 3270 pounds/sq. in. |
| Tear strength | 187 gms. per mil. |
| Elongation at break | 114%. |
| Oxygen transmission | 16.2 cc./mil/100 sq. in./24 hrs. |
| Nitrogen transmission | 1.8 cc./mil/100 sq. in./24 hrs. |
| Carbon dioxide transmission | 102 cc./mil/100 sq. in./24 hrs. |
| Moisture vapor permeability | 26.0 g./mil/100 sq. in./24 hrs. |

*Example 3*

A polyurethane was prepared in the manner described in Example 1 except that the monomeric ester glycol, di-(B-hydroxy ethyl) azelate, was a reaction product of 2 moles ethylene glycol and 1 mole azelaic acid and was used in the amount of 9.14 gms. (0.033 mole). This polymer had a softening point of 120–125° C. and solubility characteristics similar to those set out in Example 1.

Films produced from the polymer of Example 3 by the procedure set out in Example I were transparent, flexible, heat sealable, thermoplastic and tough. They also had the following physicals:

| | |
|---|---|
| Tensile strength | 3450 pounds/sq. in. |
| Elongation at break | 194%. |
| Moisture vapor permeability | 31.5 g./mil/100 sq. in./24 hrs. |

*Example 4*

A polyurethane was prepared in the same manner described in Example 1 except that the monomeric ester glycol, di-(B-hydroxy ethyl) sebacate, was the reaction product of 2 moles ethylene glycol and 1 mole sebacic acid and was used in the amount of 9.60 gms. (0.033 mole). The resultant polymer had a softening point of 120–127° C. and solubility characteristics similar to those set out in Example 1.

Films produced from the polymer of Example 4 by the procedure set out in Example 1 were transparent, flexible, heat sealable, thermoplastic and tough and had the following physicals:

| | |
|---|---|
| Tensile strength | 3510 pounds/sq. in. |
| Tear strength | 160 gms. per mil |
| Oxygen transmission | 14.4 cc./mil/100 sq. in./24 hrs. |
| Nitrogen transmission | 0 cc./mil/100 sq. in./24 hrs. |
| Carbon dioxide transmission | 107 cc./mil/100 sq. in./24 hrs. |
| Moisture vapor permeability | 37 g./mil/100 sq. in./24 hrs. |

*Example 5*

A polyurethane was prepared by the procedure of Example 1 except that the monomeric ester glycol, (B-hydroxy ethyl, γ-hydroxy propyl) adipate, used was a mixed reaction product of 1 mole ethylene glycol and 1 mole propylene glycol and 1 mole adipic acid and was used in the amount of 8.23 gms. (0.033 mole). The resultant polymer had a softening point of 125–132° C. and solubility characteristics similar to those set out in Example 1.

Films produced from the polymer of Example 5 by the procedure set out in Example 1 were transparent, flexible, heat sealable, thermoplastic and tough and also had the following physicals:

Tensile strength_____ 3800 pounds/sq. in.
Tear strength_____ 295 gms. per mil.
Elongation at break____ 705%.
Oxygen transmission___ 15.7 cc./mil/100 sq. in./24 hrs.
Nitrogen transmission__ 0 cc./mil/100 sq. in./24 hrs.
Carbon dioxide
  transmission_____ 93 cc./mil/100 sq. in./24 hrs.
Moisture vapor
  permeability_____ 30 g./mil/100 sq. in./24 hrs.

*Example 6*

A polyurethane was prepared in the manner described in Example 1, except that the monomeric ester glycol, di-(B-hydroxy ethyl) pimelate, employed was the reaction product of 2 moles ethylene glycol and 1 mole pimelic acid, and was used in the amount of 8.22 gms. (0.033 mole). The resultant polymer had a softening point of 117–122° C. and solubility characteristics similar to those set out in Example 1.

Films produced from the polymer of Example 6 by the procedure set out in Example 1 were transparent, flexible, heat sealable, thermoplastic and tough and had the following physicals:

Tensile strength_____ 5930 pounds/sq. in.
Tear strength_____ 310 gms. per mil.
Elongation at break____ 688%.
Oxygen transmission___ 12.8 cc./mil/100 sq. in./24 hrs.
Carbon dioxide
  transmission_____ 105 cc./mil/100 sq. in./24 hrs.
Nitrogen transmission__ 0 cc./mil/100 sq. in./24 hrs.
Moisture vapor
  permeability_____ 31 g./mil/100 sq. in./24 hrs.

*Example 7*

The following compounds in the proportions set out were introduced in a reaction vessel containing a solvent mixture of 180 cc. chlorobenzene and 20 cc. orthodichlorobenzene.

(B-hydroxy ethyl, γ-hydroxy
  propyl)adipate the esterifi-
  cation product of_____ 27.9 gms. (0.1125 mole).
1 mole ethylene glycol, 1
  mole propylene glycol, 1
  mole adipic acid_____
1,4-butanediol_____ 4.5 gms. (0.05 mole).
2,5 hexanediol_____ 1.97 gms. (0.0167 mole).
diethylene glycol_____ 12.33 gms. (0.1167 mole).

An inert atmosphere of nitrogen gas was maintained in the reaction while the above described mixture was thoroughly agitated and heated to a temperature of 65–70° C. at which temperature 55.70 grams (0.3316 mole) of hexamethylene diisocyanate were added gradually over a period of 45 minutes. After the addition of the diisocyanate, the reaction mass was heated under atmospheric reflux for 7 hours. The mass is then permitted to cool to room temperature where upon the polyurethane precipitated out of solution from the inert solvent. The precipitated polyurethane was then filtered out of the mass, washed with diethyl ether and dried. A yield of 79.5 percent, by weight, was obtained. The resultant polymer had a softening point of 172–175° C. and was soluble in hot pyridine and insoluble in hot or cold benzyl alcohol, cyclohexanone and phenol.

Films produced from the polymer of Example 7 by the procedure set out in Example 1 were transparent, flexible, heat sealable and tough. In addition to having a high returnable stretch, they also had the following physicals:

Tensile strength_____ 7420 pounds/sq. in.
Tear strength_____ 360 gms. per mil.
Elongation at break____ 750%.
Oxygen transmission___ 34.6 cc./mil/100 sq. in./24 hrs.
Nitrogen transmission__ 26 cc./mil/100 sq. in./24 hrs.
Carbon dioxide
  transmission_____ 203 cc./mil/100 sq. in./24 hrs.
Moisture vapor
  permeability_____ 32 g./mil/100 sq. in./24 hrs.

The films were also practically insoluble in hot pyridine, due to cross linking.

*Example 8*

A polyurethane was prepared as described in Example 7 except that the monomeric ester glycol, di-(B-hydroxy ethyl) sebacate, was the esterification product of 2 moles ethylene glycol and 1 mole sebacic acid and was used in the amount of 32.60 gms. (0.1125 mole). The resultant polymer had a softening point of 180–183° C. and its solubilities were the same as described in Example 7.

Films produced from the polymer of Example 8 by the procedure set out in Example 1 were transparent, flexible, heat sealable and tough. In addition to having a high returnable stretch, they also had the following physicals:

Tensile strength_____ 3835 pounds/sq. in.
Tear strength_____ 273 gms. per mil.
Elongation at break_____ 383%.
Oxygen transmission_____ 35 cc./mil/100 sq. in./24 hrs.
Nitrogen transmission____ 28.9 cc./mil100 sq. in.24 hrs.
Carbon dioxide
  transmission_____ 205 cc./mil/100 sq. in./24 hrs.
Moisture vapor
  permeability_____ 27.5 g./mil/100 sq. in./24 hrs.

The films were practically insoluble in hot pyridine due to cross linking.

*Example 9*

A polyurethane prepared as described in Example 7 except that the monomeric ester glycol, di-(B-hydroxy ethyl) glutarate, was the esterification product of 2 moles ethylene glycol and 1 mole glutaric acid and was used in the amount of 26.26 g. (0.1190 mole). This polymer had a softening point of 185–188° C. and the solubilities were the same as for the polymer described in Example 7.

Films produced from the polymer of Example 9 by the procedure set out in Example 1 were transparent, flexible, heat sealable and tough. In addition to being practically insoluble in hot pyridine due to cross linking, the films had a high returnable stretch and the following physicals.

Tensile strength_____ 4650 pounds/sq. in.
Tear strength_____ 206 gms. per mil.
Elongation at break_____ 595%.
Oxygen transmission_____ 38 cc./mil/100 sq. in./24 hrs.
Nitrogen transmission____ 35.6 cc./mil/100 sq. in./24 hrs.
Carbon dioxide
  transmission_____ 225 cc./mil/100 sq. in./24 hrs.
Moisture vapor
  permeability_____ 40 g./mil/100 sq. in./24 hrs.

*Example 10*

A polyurethane was prepared as described in Example 7 except that the monomeric ester glycol, di-(B-hydroxy ethyl) azelate, used was a reaction product of 2 moles ethylene glycol and 1 mole azelaic acid and was used in the amount of 30.97 g. (0.1125 mole). This polymer had a softening point of 170–175° C. and its solubilities were the same as the polymer of Example 7.

Films produced from the polymer of Example 10 by the procedure set out in Example 1 were transparent, flexible, heat sealable and tough. They were practically insoluble in hot pyridine, due to cross linking, and had a high elastic recovery as well as the following physicals:

Tensile strength_____ 5045 pounds/sq. in.
Tear strength_____ 325 gms. per mil.
Elongation at break_____ 475%.
Oxygen transmission_____ 30 cc./mil/100 sq. in./24 hrs.
Nitrogen transmission____ 22 cc./mil/100 sq. in./24 hrs.

Carbon dioxide
  transmission_____ 192 cc./mil/100 sq. in./24 hrs.
Moisture vapor
  permeability_____ 37.8 g./mil/100 sq. in./24 hrs.

*Example 11*

A polyurethane was prepared in the same manner described in Example 7 except that the monomeric ester glycol, di-(B-hydroxy ethyl) pimelate, used was the reaction product of 2 moles ethylene glycol and 1 mole pimelic acid and was used in the amount of 27.90 g. (0.1125 mole). The resultant polymer had a softening point of 165–168° C. and its solubilities were the same as the polymer described in Example 7.

Films produced from the polymer of Example 11 by the procedures set out in Example 1 had the same properties of the film of Example 7. They also had the following physicals:

Tensile strength_____ 7350 pounds/sq. in.
Tear strength_____ 203 gms. per mil.
Elongation at break_____ 886%.
Oxygen transmission_____ 31 cc./mil/100 sq. in./24 hrs.
Nitrogen transmission_____ 28 cc./mil/100 sq. in./24 hrs.
Carbon dioxide
  transmission_____ 205 cc./mil/100 sq. in./24 hrs.
Moisture vapor
  permeability_____ 31.5 g./mil/100 sq. in./24 hrs.

The polymeric materials obtained by this invention are especially suitable for the production of unsupported, self-sustaining films which have improved flexibility with or without elastic return. Such films can be made of any desired thickness, as for example, from 0.0005 to 0.0050 inch or more. They are admirably suitable for wrappings and packaging applications and will tend to cling to the contents.

The polyurethane are also useful in the production of continuous filaments for use as threads and in the making of fabrics. They can also be used as coatings on bases such as for cloth, paper, metal, leather, films, etc.

Since it is apparent that various changes and modifications may be made in the above illustrative embodiments without departing from the nature and spirit thereof, this invention is not limited thereto, except as set forth in the appended claims.

What is claimed is:

1. A method of producing polymeric materials, suitable for the production of films, which comprises reacting by heating together in the presence of an inert solvent substantially equimolar amounts of a monomeric diiso compound containing two groups of the formula —N=C=X separated by a radical having at least 4 carbon atoms therein, said radical being selected from the group consisting of straight chain aliphatic radicals, branched chain aliphatic radicals, and cycloaliphatic radicals, and where X is a member selected from the group consisting of oxygen and sulfur; and of a glycol mixture containing a glycol and a monomeric ester glycol; wherein said glycol has at least 4 carbon atoms between the hydroxyl groups and is at least one member selected from the group consisting of glycols having the formula $HO-(CH_2)_nOH$ where $n$ is an integer from 4 to 10, polyether glycols having the formula

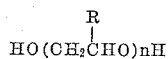

where $n$ is an integer from 2 to 5 and R is selected from the group consisting of hydrogen and a lower alkyl radical, glycols having the formula

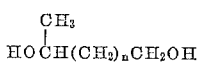

where $n$ is an integer from 2 to 5, and cycloaliphatic glycols; and wherein said monomeric ester glycol is the reaction product of one mole of an aliphatic dicarboxylic acid containing at least 2 carbon atoms between the carboxyl groups and 2 moles of a glycol having at least 2 carbon atoms between hydroxyl groups and selected from the group consisting of glycols having the formula $HO-(CH_2)_nOH$ wherein $n$ is an integer from 2 to 8, polyether glycols having the formula

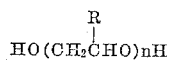

wherein $n$ is an integer from 1 to 4 and R is selected from the group consisting of hydrogen and a lower alkyl radical, glycols having the formula

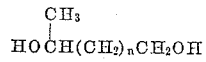

wherein $n$ is an integer from 0 to 6, and cycloaliphatic glycols; said monomeric ester glycol constituting from about 5 to about 95 mole percent of said glycol mixture.

2. A method, as set forth in claim 1, wherein up to about 1.15 moles of said diiso compound are present per mole of glycol mixture.

3. A method, as set forth in claim 1, wherein said monomeric ester glycol constitutes from about 10 to about 50 mole percent of said glycol mixture and up to 1.15 moles of said diiso compound are present per mole of glycol mixture.

4. A method, as set forth in claim 1, wherein said glycol mixture contains at least one primary glycol and at least one secondary glycol having at least one secondary hydroxyl group.

5. A method, as set forth in claim 4, wherein said secondary glycol constitutes from about 10 to about 50 mole percent based on the aggregate mole amount of said primary glycols and secondary glycols.

6. A method of producing polymeric materials, suitable for the production of films, which comprises reacting by heating in the presence on an inert solvent from 1.0 to about 1.05 moles of a monomeric diiso compound, containing two groups of the formula —N=C=X separated by a radical having at least four carbon atoms therein, said radical being selected from the group consisting of straight chain aliphatic radicals, branched chain aliphatic radicals, and cycloaliphatic radicals, and where X is a member selected from the group consisting of oxygen and sulphur; with 1 mole of a glycol mixture containing a glycol having at least 4 carbon atoms between hydroxyl groups and is at least one member selected from the group consisting of glycols having the formula $HO-(CH_2)_nOH$ wherein $n$ is an integer from 4 to 10, polyether glycols having the formula

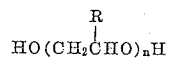

wherein $n$ is an integer from 2 to 5 and R is selected from the group consisting of hydrogen and a lower alkyl radical, glycols having the formula:

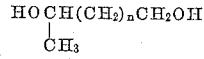

wherein $n$ is an integer from 2 to 5 and cycloaliphatic glycols; and a monomeric ester glycol which is the reaction product of 2 moles of a glycol containing at least 2 carbon atoms between hydroxyl groups and selected from the group consisting of glycols having the formula $HO-(CH_2)_nOH$ wherein $n$ is an integer from 2 to 8, polyether glycols having the formula

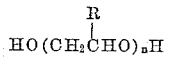

wherein $n$ is an integer from 1 to 4 and R is selected from the group consisting of hydrogen and a lower alkyl radical, glycols having the formula:

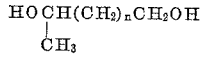

wherein $n$ is an integer from 0 to 6, and cycloaliphatic glycols with one mole of an aliphatic dicarboxylic organic acid containing at least 2 carbon atoms between the carboxyl groups, said monomeric ester glycol constituting from about 5 to about 95 mole percent of the glycol mixture.

7. A method, as set forth in claim 6, wherein said monomeric ester glycol constitutes from about 10 to about 50 mole percent of said glycol mixture.

8. A method, as set forth in claim 6, wherein said glycol mixture contains a primary glycol and a secondary glycol having at least one secondary hydroxyl group.

9. A method, as set forth in claim 8, wherein said secondary glycol constitutes from about 10 to about 50 mole percent of the aggregate mole amount of said primary and secondary glycols.

10. A method of preparing polymeric material suitable for the production of films, which comprises reacting together by heating in the presence of an inert solvent from about 1.05 moles to about 1.15 moles of a monomeric diiso compound containing two groups of the formula —N=C=X separated by a radical having at least 4 carbon atoms therein, said radical being selected from the group consisting of straight chain aliphatic radicals, branched chain and cycloaliphatic radicals, and where X is a member selected from the groups consisting of oxygen and sulphur; with a molar amount of a glycol mixture containing a glycol having at least 4 carbon atoms between hydroxyl groups, and is at least one member selected from the group consisting of glycols having the formula HO—(CH$_2$)$_n$OH wherein $n$ is an integer from 4 to 10, polyether glycols having the formula

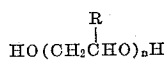

wherein $n$ is an integer from 2 to 5 and R is selected from the group consisting of hydrogen and a lower alkyl radical, glycols having the formula:

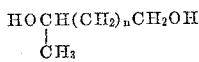

wherein $n$ is an integer from 2 to 5, and cycloaliphatic glycols; and a monomeric ester glycol, being the reaction product of 2 moles of a glycol having at least 2 carbon atoms between hydroxyl groups and selected from the group consisting of glycols having the formula HO—(CH$_2$)$_n$OH wherein $n$ is an integer from 2 to 8, polyether glycols having the formula

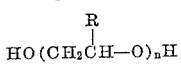

wherein $n$ is an integer from 1 to 4 and R is selected from the group consisting of hydrogen and a lower alkyl radical, glycols having the formula:

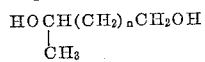

wherein $n$ is an integer from 0 to 6, and cycloaliphatic glycols; with one mole of an aliphatic dicarboxylic organic acid containing at least 2 carbon atoms between carboxyl groups, said monomeric ester glycol constituting from about 5 to about 95 mole percent of said glycol mixture.

11. A method, as set forth in claim 10, wherein said monomeric ester glycol constitutes from about 10 to about 50 mole percent of said glycol mixture.

12. A method, as set forth in claim 10, wherein said glycol mixture contains both a primary glycol and a secondary glycol having at least one secondary hydroxyl group.

13. A method as set forth in claim 12, wherein said secondary glycol constitutes from about 10 to about 50 mole percent based on the aggregate mole amount of said primary and secondary glycols.

14. A polymeric reaction product of substantially equimolar amounts of (1) a monomeric diiso compound containing two groups of the formula —N=C=X separated by a radical having at least 4 carbon atoms therein, said radical being selected from the group consisting of straight chain aliphatic radicals, branched chain aliphatic radicals, and cycloaliphatic radicals, and where X is a member selected from the group consisting of oxygen and sulphur; and of (2) a glycol mixture containing a glycol and a monomeric ester glycol; wherein said glycol has at least 4 carbon atoms between hydroxyl groups and is at least one member selected from one group consisting of glycols having the formula HO—(CH$_2$)$_n$OH wherein $n$ is an integer from 4 to 10, polyether glycols having the formula

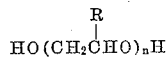

wherein $n$ is an integer from 2 to 5 and R is selected from the group consisting of hydrogen and a lower alkyl radical, glycols having the formula:

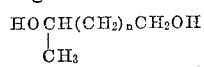

wherein $n$ is an integer from 2 to 5, and cycloaliphatic glycols; and wherein said monomeric ester glycol is the reaction product of one mole of an aliphatic dicarboxylic acid containing at least 2 carbon atoms between carboxyl groups and 2 moles of a glycol having at least 2 carbon atoms between hydroxyl groups and selected from the group consisting of glycols having the formula HO—(CH$_2$)$_n$OH wherein $n$ is an integer from 2 to 8, polyether glycols having the formula

wherein $n$ is an integer from 1 to 4 and R is selected from the group consisting of hydrogen and a lower alkyl radical, glycols having the formula

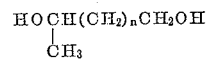

wherein $n$ is an integer from 0 to 6, and cycloaliphatic glycols; said monomeric ester glycol constituting about 5 to about 95 mole percent of said glycol mixture.

15. A polymeric composition as set forth in claim 14 wherein up to 1.05 moles of said diiso compound are reacted with said glycol mixture.

16. A polymeric composition as set forth in claim 14, wherein between 1.05 and 1.15 moles of said diiso compound are reacted with said glycol mixture.

17. The product of claim 14 in the form of a flexible film.

18. The product of claim 16 in the form of a flexible film.

References Cited in the file of this patent

UNITED STATES PATENTS

| | | |
|---|---|---|
| 2,284,637 | Catlin | June 2, 1942 |
| 2,729,618 | Muller et al. | Jan. 3, 1956 |
| 2,801,648 | Anderson et al. | Aug. 6, 1957 |
| 2,858,296 | Stilmar | Oct. 28, 1958 |
| 2,871,218 | Schollenberger | Jan. 27, 1959 |

OTHER REFERENCES

Bayer: Angewandte Chemie, Sept. 1947, pp. 257–288.
"Hackh's Chem. Dictionary," 3rd ed., p. 383, McGraw-Hill Book Co., Inc., N.Y., 1944.